(No Model.)

L. MATTHEWS.
METHOD OF TRAINING HEDGES.

No. 569,720. Patented Oct. 20, 1896.

WITNESSES:
J. E. Luckett
M. E. DeMoll

INVENTOR
Luther Matthews
BY
Fred G. Dieterich & Co.
ATTORNEYS

UNITED STATES PATENT OFFICE.

LUTHER MATTHEWS, OF PARIS, TENNESSEE.

METHOD OF TRAINING HEDGES.

SPECIFICATION forming part of Letters Patent No. 569,720, dated October 20, 1896.

Application filed May 18, 1895. Serial No. 549,778. (No specimens.)

*To all whom it may concern:*

Be it known that I, LUTHER MATTHEWS, residing at Paris, in the county of Henry and State of Tennessee, have invented certain new and useful Improvements in Hedge Fences, of which the following is a specification.

My invention relates to the method of training hedges; and such invention primarily has for its object to provide a hedge fence possessing the elements of economy in construction, neat appearance, and general effectiveness.

The invention consists in the peculiar construction of hedge fence and method of producing the same, such as will hereinafter be first described in detail, and then specifically pointed out in the appended claim, reference being had to the accompanying drawings, in which—

Figure 1:
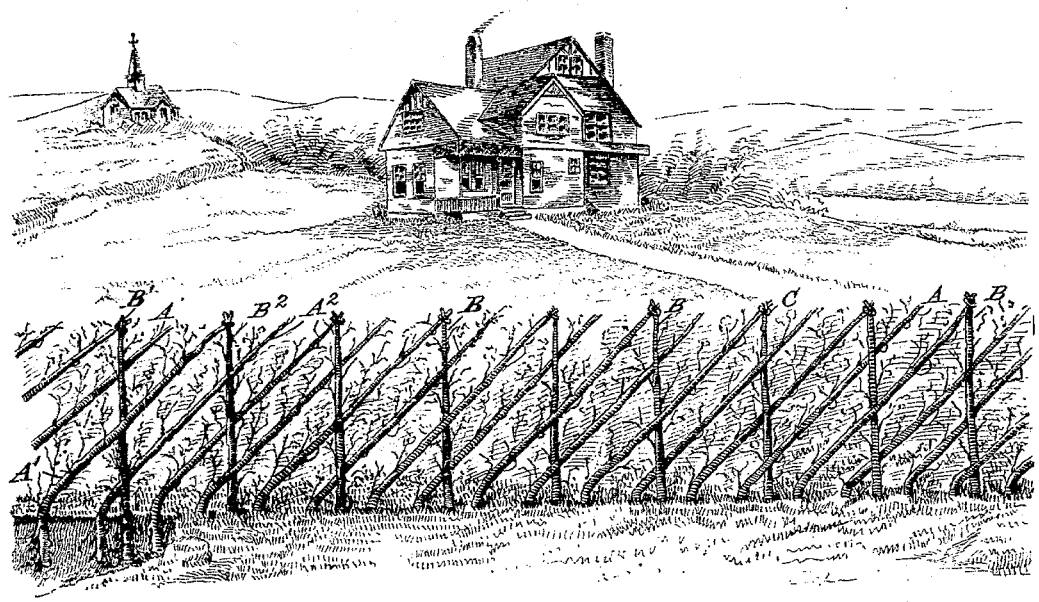
Figure 2:
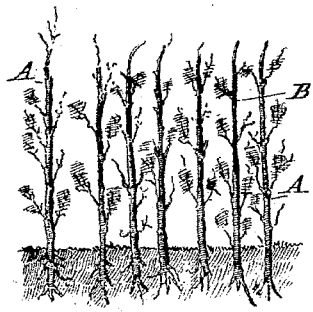
Figure 3:
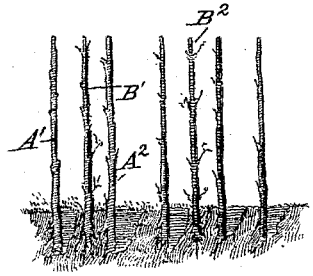
Figure 4:
Figure 5:
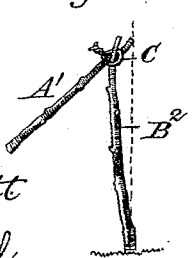
Figure 6:
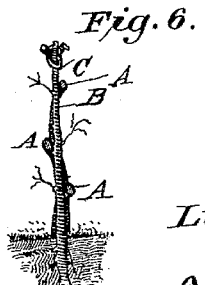

Figure 1 illustrates a section of a hedge fence constructed in accordance with my invention. Fig. 2 illustrates the plants as they are first set and grow. Fig. 3 is a view illustrating the plants after having been "dwarfed" in the manner hereinafter described. Fig. 4 illustrates the manner in which the plants are inclined or bent after having been dwarfed. Fig. 5 is a view illustrating the manner in which the alternate inclined plants are secured to the vertically-disposed brace or stay plant; and Fig. 6 is a cross-section of the complete hedge, illustrating the manner in which the inclined plants are interlaced about the vertically-disposed brace or stay plant.

The plants A are first set in a straight line about six or eight inches apart, and between every other plant is set what I term a "brace" or "stay" plant B, as clearly shown in Fig. 1. At this point it should be stated that the plants A and B are so spaced apart that when the first plant (indicated by A' in Fig. 1) is bent down to an angle of forty-five degrees its end will contact with the upper end of the second brace or stay plant, (indicated by B² in Fig. 1,) while the second inclined plant (indicated by A²) will pass beyond the plant B² and have its upper end left free at a point about midway between it and the next stay-plant.

The object in spacing the plants in the manner stated is twofold: First, it leaves but one plant free at the top between any two successive stay-plants, and, secondly, it forms a very effective means for bracing the hedge and giving it great strength, as the upper end of the alternate plants A is secured to the top of the said brace-plants B in a manner presently described.

More effectually and successfully to produce the hedge I closely trim the plants before they are bent down, interlaced, and connected together. This I accomplish after the plants have grown to one to one and one-half inches in circumference by removing all the branches and tops and by removing the dirt away from the root and cutting off the lateral branches of the tap-root, especially so at the side to which the plant is bent. (See Fig. 3.) The earth is then put back and tightly packed down beside the plants. After the plants have been closely trimmed, as stated, the plants A are bent over to an angle of forty-five degrees and alternately passed over the front and rear of the brace-plants B, being interlaced, as it were, in the manner clearly understood by reference to Fig. 6. The alternate or first plants A' are then secured to the tops of the straight plants B by wire binders C, which securely join the ends of the plants A' and B, as shown in Fig. 5. As the two plants A' and B are secured the plant B is preferably bent over at a reverse angle to the plants A', as indicated by the arrow and dotted line in Fig. 4 and shown in full lines in Fig. 5. This gives the said plants B a certain amount of back tension, which will serve to draw the plants A' taut about the front and rear faces of the plants B, and as the said plants B in time assume practically a vertical position, as seen in Fig. 1, tend to draw all the plants to a taut condition, and thereby form a compact, strong, and neat hedge fence.

It will be clear that as the plants are closely trimmed before they are bent over, and as the plants A lie immediately one over the other, the new growth of branches will be to the top side of the plant only, and thereby filling the spaces between more fully than would be the case had the branches not been first removed.

Having thus described my invention, what I claim, and desire to secure by Letters Patent, is—

The method herein described of training hedges, which consists in setting equidistant from each other a series of plants, setting a stay-plant midway between every second such plant and the succeeding one, closely trimming all said plants when they have attained a suitable height, removing the roots from one side of all the plants of the first series, bending down said plants, and securing them to the stay-plants, substantially as shown and set forth.

L. MATTHEWS.

Witnesses:
G. L. FRYER,
S. H. FISER.